Jan. 1, 1929. 1,697,539
E. OLSSON ET AL
JUNCTION BOX FOR ELECTRIC LEAD COVERED CABLES AND THE LIKE
Original Filed Nov. 11, 1924
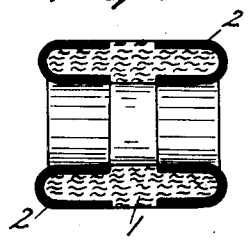
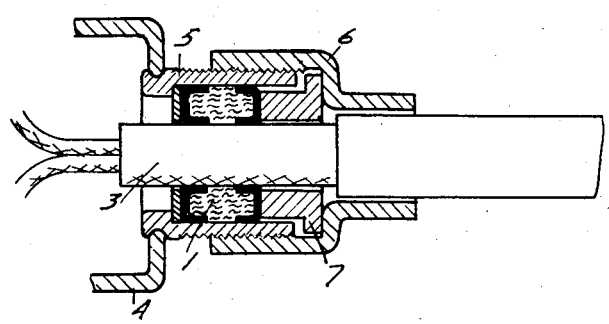
E. Olsson & B. Ell
INVENTOR
By: Marks & Clerk
ATTys Patented Jan. 1, 1929.

1,697,539

UNITED STATES PATENT OFFICE.

EINAR OLSSON AND BERNHARD ELL, OF SUNDBYBERG, NEAR STOCKHOLM, SWEDEN.

JUNCTION BOX FOR ELECTRIC LEAD-COVERED CABLES AND THE LIKE.

Original application filed November 11, 1924, Serial No. 749,213, and in Sweden December 15, 1924. Divided and this application filed March 3, 1926. Serial No. 92,069.

The present invention relates to an improvement in junction- or coupling-boxes for electric lead-covered cables and the like and, more particularly, the invention refers to an improved tight packing at the cable inlets.

In the junction- or coupling-boxes, hitherto known, it has been a matter of great difficulty to obtain a perfect tightening round the inlet place of the junction-box. Such a tightening is, however, very desirable partly in order to prevent the insulation contained in the cable from flowing out and partly to prevent it from contacting the humidity of the open air. It is also necessary, when joining the lead-covered cable, to join the cable lead-sheaths carefully with each other and with the box or fitting to obtain a reliable earthing. This earthing is very important for the security of service of the electric plant and in many countries it is also prescribed in the law.

In the arrangements, hitherto known, of this kind it is rather impossible to determine afterwards if the earthing has been carefully carried out or not. If a misfortune has happened it is also not possible to ascertain if it refers to the packing or the earthing and usually the whole box in such a case is destroyed.

The present invention has for its object to avoid this inconvenience and consists in the fact that the box, at the cable inlet or inlets is provided with an adjustable sleeve- or ring-shaped packing constructed of an elastic material, said packing being entirely or partly covered with a soft metal in such a way that at the same time the cable or cable end, which passes through the packing, obtains a tight connection with the box, this latter will be connected with the metallic cable sheath by means of the metal covering the packing.

The invention is illustrated on the annexed drawing in which Figure 1 shows the packing, while Figure 2 is a section through a part of a box provided with such a packing.

The packing consists, in the embodiment shown, of a rubber ring 1, which at both ends is provided with a lead-capsule 2. The ring is placed round the lead-sheath 3 of the cable (Figure 2) after which it is pressed together by means of any suitable device. In the embodiment shown the cable is supposed to be inserted in a junction-box 4, provided with a screwed tube-piece 5, on which is screwed a sleeve-nut 6, which presses a ring 7 or the like against the packing-ring 1, 2 so that this is compressed. This causes a good tightening to be obtained. At this same time is caused an earthing of the box 4 by means of the lead-capsules 2.

Having now particularly described the nature of our invention and the manner of its operation, what we claim is:

In a stuffing box for electric cables or the like, a ring shaped packing of elastic material adapted to fit over the cable, a channel shaped ring of soft metal engaging each end of said packing ring, said packing being exposed between said rings, and means to compress said rings longitudinally whereby the elastic material between said cups as well as the rings are pressed against said cable and said stuffing box to form a water-tight joint.

BERNHARD ELL.
EINAR OLSSON.